(12) United States Patent
Bejcek et al.

(10) Patent No.: US 9,338,940 B2
(45) Date of Patent: May 17, 2016

(54) DRIVE SYSTEMS AND METHODS FOR IMPLEMENTING ENGINE STALL PROTECTION IN A SELF-PROPELLED MACHINE

(71) Applicant: Honda Motor Co., Ltd., Tokyo (JP)

(72) Inventors: Andrew E. Bejcek, Mebane, NC (US); Vincent Andrew Prinzo, Hillsbourgh, NC (US)

(73) Assignee: Honda Motor Co., Ltd., Tokyo (JP)

( * ) Notice: Subject to any disclaimer, the term of this patent is extended or adjusted under 35 U.S.C. 154(b) by 94 days.

(21) Appl. No.: 14/192,560

(22) Filed: Feb. 27, 2014

(65) Prior Publication Data

US 2015/0237797 A1 Aug. 27, 2015

(51) Int. Cl.
| | |
|---|---|
| B60W 10/06 | (2006.01) |
| B60W 10/30 | (2006.01) |
| A01D 34/00 | (2006.01) |
| A01D 34/82 | (2006.01) |

(52) U.S. Cl.
CPC .............. *A01D 34/006* (2013.01); *A01D 34/82* (2013.01)

(58) Field of Classification Search
None
See application file for complete search history.

(56) References Cited

U.S. PATENT DOCUMENTS

| | | | |
|---|---|---|---|
| 5,337,543 A * | 8/1994 | Kitamura et al. | ............... 56/10.8 |
| 5,442,901 A | 8/1995 | Niemela et al. | |
| 5,718,105 A | 2/1998 | Irikura et al. | |
| 5,996,342 A | 12/1999 | Khan et al. | |
| 6,591,593 B1 | 7/2003 | Brandon et al. | |
| 6,948,299 B2 | 9/2005 | Osborne | |
| 6,987,328 B2 | 1/2006 | Osborne | |
| 7,013,626 B1 * | 3/2006 | Strope | ............................ 56/15.8 |
| 7,134,261 B2 | 11/2006 | Inui et al. | |
| 7,178,322 B2 | 2/2007 | Osborne | |
| 7,191,583 B2 | 3/2007 | Fukushima et al. | |
| 7,275,355 B2 | 10/2007 | Adams et al. | |
| 7,318,493 B2 | 1/2008 | Medina | |

(Continued)

FOREIGN PATENT DOCUMENTS

| | | |
|---|---|---|
| JP | H0 2145118 A | 6/1990 |
| JP | 2004-275026 A | 10/2004 |

(Continued)

OTHER PUBLICATIONS

International Search Report for Application No. PCT/IB2014/002972 dated Apr. 21, 2015.

*Primary Examiner* — Edwin A Young
(74) *Attorney, Agent, or Firm* — Jenkins, Wilson, Taylor & Hunt, P.A.

(57) ABSTRACT

Drive systems and methods for implementing engine stall protection in a self-propelled machine are disclosed. In one aspect, a drive system of a self-propelled machine incorporating engine stall protection includes an engine being in communication with a control unit and transmitting power and an engine load signal to the control unit. An actuation mechanism can be actuatable to assign a desired ground speed of the self-propelled machine, the actuation mechanism being in communication with the control unit and transmitting a control signal corresponding to the desired ground speed to the control unit. In some aspects, the control unit is configured to control a transmission motor to achieve an actual ground speed of the self-propelled machine based on both the engine load signal and the control signal. In other aspects, the engine load signal is an engine speed signal, wherein engine speed is dependent on a load applied to the engine.

20 Claims, 5 Drawing Sheets

(56) References Cited

U.S. PATENT DOCUMENTS

| | | |
|---|---|---|
| 7,370,458 B2 | 5/2008 | Matsuda et al. |
| 7,479,754 B2 | 1/2009 | Lucas et al. |
| 7,520,112 B2 | 4/2009 | Osborne |
| 7,554,213 B2 | 6/2009 | Kawakami et al. |
| 7,610,738 B2 | 11/2009 | Daly et al. |
| 7,665,283 B2 | 2/2010 | Turner et al. |
| 7,666,117 B2 | 2/2010 | Kawakami et al. |
| 7,669,393 B2 | 3/2010 | Park et al. |
| 7,677,017 B2 | 3/2010 | Holby |
| 7,728,534 B2 | 6/2010 | Lucas et al. |
| 7,744,503 B2 | 6/2010 | Kobayashi et al. |
| 7,954,308 B2 | 6/2011 | Harris |
| 2004/0244346 A1* | 12/2004 | Inui et al. .................. 56/11.9 |
| 2010/0192532 A1 | 8/2010 | Slater et al. |
| 2011/0061355 A1 | 3/2011 | Griffin |
| 2012/0097469 A1 | 4/2012 | Yang et al. |
| 2013/0097984 A1 | 4/2013 | Elder et al. |
| 2013/0104509 A1 | 5/2013 | MacKinnon et al. |
| 2013/0111864 A1 | 5/2013 | Hansen et al. |
| 2013/0111865 A1 | 5/2013 | Hansen et al. |
| 2013/0199146 A1 | 8/2013 | Rosa et al. |
| 2013/0211646 A1 | 8/2013 | Yamamura et al. |
| 2014/0013722 A1 | 1/2014 | Pitcel et al. |

FOREIGN PATENT DOCUMENTS

| | | |
|---|---|---|
| JP | 2005-16436 | 1/2005 |
| JP | 2007-318867 A | 12/2007 |
| JP | 4845591 | 10/2011 |
| WO | WO 2015/128694 A1 | 3/2015 |

* cited by examiner

DRIVE SYSTEMS AND METHODS FOR IMPLEMENTING ENGINE STALL PROTECTION IN A SELF-PROPELLED MACHINE

TECHNICAL FIELD

The subject matter disclosed herein relates generally to self-propelled machinery and related methods. More particularly, the subject matter disclosed herein relates to drive systems and related methods in a self-propelled lawnmower.

BACKGROUND

Self-propelled machines, such as lawn mowing machines or lawnmowers, are often powered by a gasoline engine and can have a self-propelled drive system that moves the lawnmower forward under its own power. Conventional "walk-behind" types of self-propelled lawnmowers typically use a drive system that is mechanically coupled with the engine crankshaft. Typically, a transmission converts the speed and direction of rotation of the engine to transmit power to the lawnmower wheels. In such a configuration, the transmission can have either a variable speed output or a fixed speed output. However, when an operator encounters very tall grass during operation of the self-propelled lawnmower, there is a likelihood of engine stall due to the increased load on the engine. Currently, in such scenarios, self-propelled lawnmowers require the operator to either reduce the transmission speed or disengage the transmission drive to reduce the load on the engine and prevent the engine from stalling. In order for the operator to perceive that the engine is experiencing a load that may cause it to stall, the operator must rely on the sound of the engine.

Therefore, a need exists for engine stall protection in conventional, self-propelled "walk-behind" lawnmowers that are time-efficient, and simple and easy to use, in order to allow the operator to focus only on mowing without concern about engine stall.

SUMMARY

In accordance with this disclosure, drive systems and related methods for implementing engine stall protection in a self-propelled machine are provided. The use of drive systems and methods implementing engine stall protection in a self-propelled machine can provide advantageous and unexpected results including, for example, improved control of a self-propelled machine, easy speed change in a self-propelled machine, improved ease-of operation of a self-propelled machine, intuitive controls, improved comfort during operation of a self-propelled machine, low operator fatigue and easy to understand controls.

In some aspects, drive systems and methods implementing engine stall protection in a self-propelled machine comprise an engine and an actuation mechanism. In some aspects, the engine is in communication with a control unit and transmits power and an engine load signal to the control unit, while the actuation mechanism is actuatable by an operator to assign a desired ground speed of the self-propelled machine. In one aspect, the engine load signal comprises an engine speed signal, wherein a speed of the engine is dependent on a load applied to the engine. In some aspects, the actuation mechanism can be in communication with the control unit and transmit a control signal corresponding to the desired ground speed to the control unit. In one exemplary implementation, the control unit can be configured to control a transmission motor to achieve an actual ground speed of the self-propelled machine based on both the engine speed and the control signal.

These and other objects of the present disclosure as can become apparent from the disclosure herein are achieved, at least in whole or in part, by the subject matter disclosed herein.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides and/or includes drive systems and related methods for implementing engine stall protection in a self-propelled machine, such as a lawn mower. In some aspects, such drive systems and related methods can comprise a stall protection control scheme, and they can provide advantageous and unexpected results including improved ease-of-operation, improved time-efficiency, lower operator fatigue, and/or prevention of engine stall of the self-propelled machinery.

In some aspects, drive systems and methods described herein can be used with self-propelled machines having a hybrid motor or engine, including a gas motor and an electric transmission. In some aspects, systems and methods described herein can control aspects of the electric transmission, which can transmit power to one or more wheels of the self-propelled machinery. In some aspects, controls, systems, and methods described herein can comprise electric controls configured to start and/or control aspects of the electric transmission.

In some aspects, systems and methods described herein can comprise one or more controls which can be engaged by the operator before, during, or as an operator steers the self-propelled machinery. For example, the controls can comprise a ground speed control adapted to electrically communicate with the transmission, that can be actuated by the operator before, during, or as the operator steers the self-propelled machinery. In some aspects, the controls can be disposed over gripping portions of the control device or system, thereby allowing one-handed (e.g., single handed) control over and/or operation of the self-propelled machine.

In some aspects, the one or more electric controls can electrically communicate with the transmission via an electronic control unit (ECU). The electrical control unit can comprise an electrical device configured to provide operational sequencing for a hybrid engine. In some aspects, the subject matter described herein may be implemented in software in combination with hardware and/or firmware. For example, the subject matter described herein may be implemented in software executed by a processor (e.g., a hardware-based processor), microprocessor, and/or microcontroller of electric control unit. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory devices, such as disk memory devices, logic devices, logic transistors, chip memory devices, programmable logic devices, such as field programmable gate arrays, and application specific integrated circuits. In addition, a computer readable medium that implements the subject matter described herein may be located on a single device or computing platform or may be distributed across multiple devices or multiple computing platforms.

As used herein, the terms "signal" and "pulse" are generic to multiple forms of communication unless otherwise specified. For example, "signal" can include electrical, digital or analog signals. Additionally, in some embodiments, other forms of communication may be included.

As used herein, the terms "controller", and/or "control unit" refer to software in combination with hardware and/or firmware for implementing features described herein. In some embodiments, a controller may include a microprocessor, a processor, or a microcontroller.

Aspects of the present subject matter now will be described more fully hereinafter with reference to the accompanying drawings, in which some aspects of the present subject matter are shown. This present subject matter may, however, be embodied in many different forms and should not be construed as limited to the embodiments set forth herein. Like numbers refer to like elements throughout.

As illustrated in the various figures, some sizes of structures or portions are exaggerated relative to other structures or portions for illustrative purposes and, thus, are provided to illustrate the general structures of the present subject matter. Furthermore, various aspects of the present subject matter are described with reference to a structure or a portion being formed on other structures, portions, or both. As will be appreciated by those of skill in the art, references to a structure being formed "on" or "above" another structure or portion contemplates that additional structure, portion, or both may intervene. References to a structure or a portion being formed "on" another structure or portion without an intervening structure or portion are described herein as being formed "directly on" the structure or portion. Similarly, it will be understood that when an element is referred to as being "connected", "attached", or "coupled" to another element, it can be directly connected, attached, or coupled to the other element, or intervening elements may be present. In contrast, when an element is referred to as being "directly connected", "directly attached", or "directly coupled" to another element, no intervening elements are present.

Furthermore, relative terms such as "on", "above", "upper", "top", "lower", or "bottom" are used herein to describe one structure's or portion's relationship to another structure or portion as illustrated in the figures. It will be understood that relative terms such as "on", "above", "upper", "top", "lower" or "bottom" are intended to encompass different orientations of the package or component in addition to the orientation depicted in the figures. For example, if the package or component in the figures is turned over, structure or portion described as "above" other structures or portions would now be oriented "below" the other structures or portions. Likewise, if the package or component in the figures are rotated along an axis, structure or portion described as "above", other structures or portions would be oriented "next to" or "left of" the other structures or portions.

Unless the absence of one or more elements is specifically recited, the terms "comprising", including", and "having" as used herein should be interpreted as open-ended terms that do not preclude the presence of one or more elements.

Figure 1:
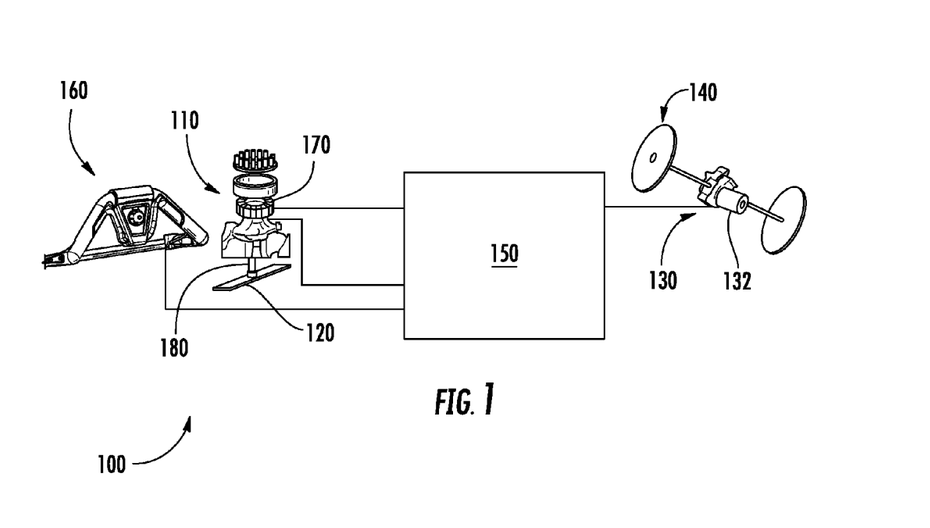
FIG. 1 is a schematic representation of a drive system for implementing engine stall protection in a self-propelled machine according to an embodiment of the presently-disclosed subject matter.

In one aspect, the presently disclosed subject matter discloses drive systems and related methods for implementing engine stall protection in a self-propelled machine, such as a lawnmower. As shown in FIG. 1, for example, a drive system, generally designated 100, can comprise an engine 110 that is configured to drive the operation of a working element 120, such as one or more rotary lawnmower blades. Specifically, for example, engine 110 can comprise a crankshaft 180, which can directly power working element 120 of the self-propelled machine, such as a lawnmower blade. Drive system 100 can further comprise a self-propulsion transmission 130 configured to supply power to one or more wheels 140 of the self-propelled machine at a selected forward ground speed. Rather than being mechanically driven by engine 110 directly, however, transmission 130 can be electrically driven, and the operation of transmission 130 can be controlled by a control unit 150 in communication with both engine 110 and a control device, generally designated 160.

Figure 2:
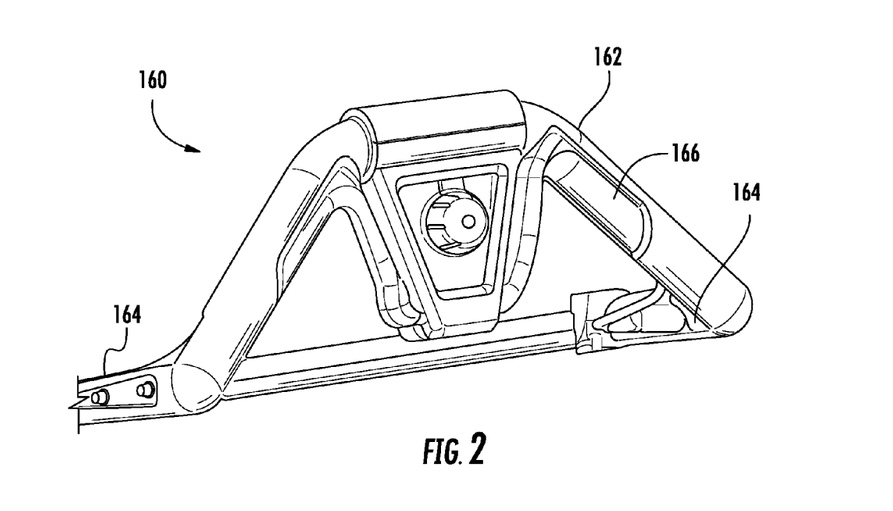
FIG. 2 is a front perspective view illustrating an actuation mechanism for drive systems for implementing engine stall protection in a self-propelled machine according to one aspect of the subject matter described herein.

Regarding the control of drive system 100, FIG. 2 is a perspective view of control device 160 that can be used in a self-propelled machine. In some aspects, control device 160 can be provided at a distal end portion of a handle, generally designated 162, that extends behind a main operative assembly of the self-propelled machine. As shown in FIG. 2, for example, handle 162 can comprise one or more legs 164 that extend behind the main operative assembly of the self-propelled machine, and control device 160 can be coupled to a distal end of the one or more legs 164. In some aspects, control device 160 can comprise one or more grips or gripping portions of handle 162 to which an operator can grasp while walking behind the machine during movement thereof.

Additionally, control device 160 can advantageously comprise one or more controls and/or actuation mechanisms for activating and/or controlling one or more engines of the machine, and/or for controlling a speed and/or motion thereof. Notably, the controls and/or actuation mechanisms can be intuitive and/or easily reachable from the one or more gripping portions (e.g., disposed over one of the one or more legs 164). Control device 160 can advantageously provide for one-handed control and steering of the self-propelled machine. Specifically, for example and in some aspects, control device 160 can comprise a ground speed control 166. In the particular configuration shown in FIG. 2, for example, ground speed control 166 can be a control lever that is pivotable with respect to handle 162 to selectively engage and precisely control the operation of drive system 100. Those having ordinary skill in the art will recognize, however, that ground speed control 166 can be otherwise configured as a dial, handle, push button, knob, and/or any other intuitive speed control setting. Regardless of the particular configuration, ground speed control 166 can be configured to be easy to understand and not overly complex. Such an intuitive, easily manipulated, and easily reachable (e.g., centralized with respect to the operator) control can advantageously allow a self-propelled machine that incorporates control device 160 to be used, operated, and, therefore, purchased by larger portions of the general population, including elderly consumers.

Regarding the particular operation of the drive systems and related methods disclosed herein, ground speed control 166 can be configured to be operable by an operator to select a desired ground speed of the self-propelled machine. In particular, the desired ground speed can be selectively chosen by the operator through manipulation of ground speed control 166, such as by moving ground speed control 166 to any of a range of operating positions corresponding to one of a predetermined range of desired ground speeds. This operability advantageously allows an operator to choose a ground speed that best suits the terrain and/or the operator's mobility, among other factors. The desired ground speed can be selected by the operator while ground speed control 166 can be configured to transmit the selected desired ground speed, in the form of a signal or pulse, to transmission 130 via a control unit 150. For example, ground speed control 166 can be configured to transmit an electrical signal or pulse (e.g. a control signal) to control unit 150 by way of an electrical sensor. Ground speed control 166 can alternatively be configured to transmit a digital or analog signal to control unit 150, while other alternative means of communication can also be utilized. In one aspect, the control signal can communicate the desired ground speed to control unit 150 essentially as a ratio of the desired ground speed compared to a maximum ground speed setting. Under normal operating conditions, control unit 150 can be configured to control transmission 130 to drive the self-propelled machine at the desired ground speed selected by way of ground speed control 166.

As discussed below, however, control unit 150 can be configured to interpret the operator-selected desired ground speed signal in view of a capability of engine 110 to achieve acceptable performance of the self-propelled machine. Specifically, for example, control unit 150 can scale the controlled speed to be different than the desired ground speed based on information derived from engine (e.g., an engine speed signal). In this way, control unit 150 can automatically reduce the transmission speed or even disengage the transmission drive in order to reduce the load on the engine and automatically prevent the engine from stalling.

Figure 3:
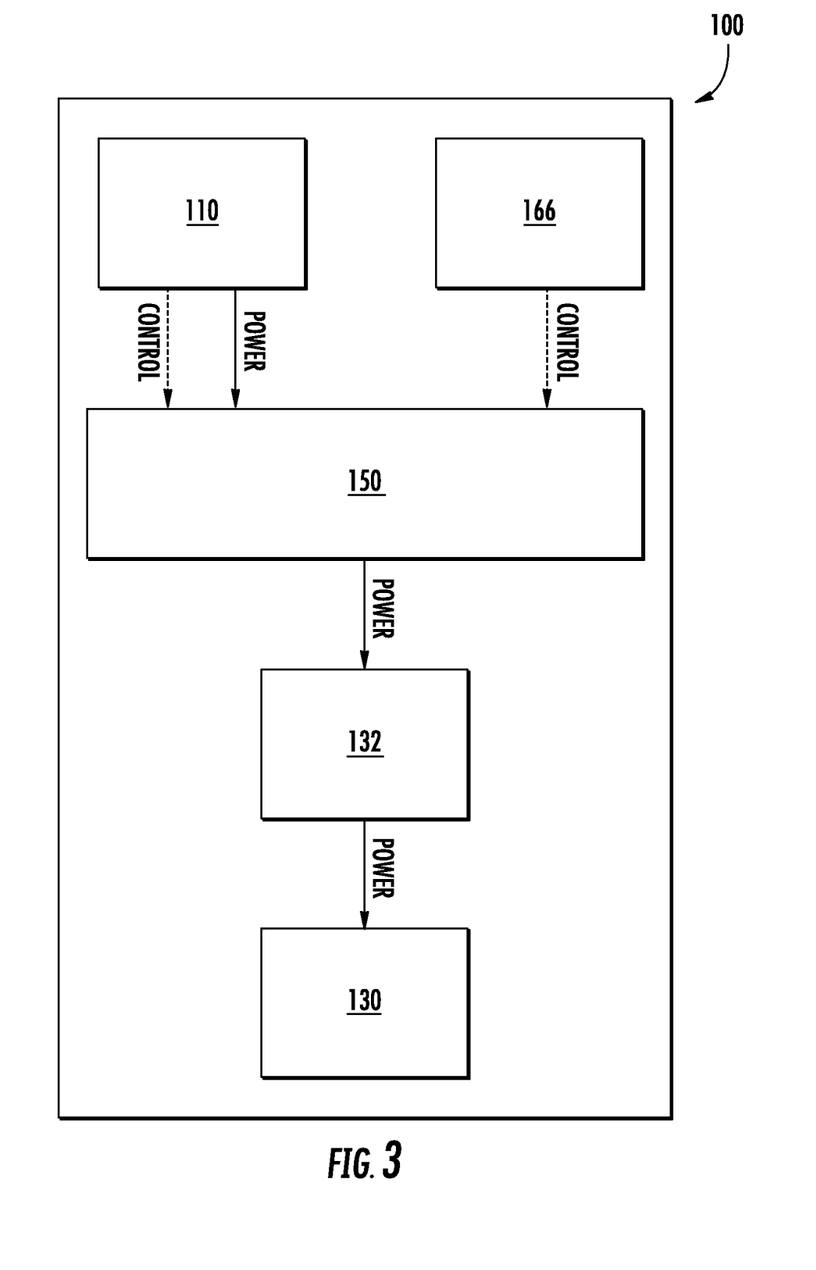
FIG. 3 is a block diagram illustrating a drive system for implementing engine stall protection in a self-propelled machine according to one aspect of the subject matter described herein.

In this regard, the present subject matter can comprise systems and methods for adjusting the ground speed to account for high engine loading and automatically prevent the engine from stalling. For example, FIG. 3 is a block diagram illustrating components of drive system 100 that are operable for implementing engine stall protection in a self-propelled machine, such as a lawnmower. The self-propelled machine can comprise an actuation mechanism (e.g. ground speed control 166) as described hereinabove, which can be electrically connected to and/or electrically communicate with control unit 150. The actuation mechanism can electrically communicate with electric control unit via one or more interfaces, which in turn can communicate with and/or control aspects of transmission 130 via a transmission motor 132. In some aspects, transmission 130 can comprise an electric transmission, and transmission motor 132 can be an electric transmission motor that is powered using an electrical actuator or generator 170 and/or a battery where engine 110 is not running (See, e.g., FIG. 1). In some aspects, electrical actuator or generator (or any other type of rotating object) 170 can be coupled and/or mounted onto crankshaft 180 of engine 110. Electric transmission motor 132 can be adapted to directly power transmission 130, and transmission 130 can be adapted to transfer and/or supply power directly to one or more wheels 140 of the self-propelled machine.

Notably, engine 110 can be configured to separately communicate an engine load and transmit power to control unit 150. Specifically, for example, the engine load can be communicated to control unit 150 in the form of a signal or pulse (e.g., as an electrical signal or pulse) using a sensor mounted to a stator or alternator of electrical actuator or generator 170. In this configuration, the engine load signal or pulse transmitted to control unit 150 can be used to implement an engine stall protection scheme, discussed in detail below. Those having skill in the art will recognize that the engine speed (e.g., measured in revolutions per minute (RPM)) can be an indicator of a load being applied to engine 110. For example, where the self-propelled machine is configured as a lawnmower, when the lawnmower encounters very tall grass there is generally an increased load applied to engine 110, which consequently decreases engine speed; a natural characteristic of a mechanical centrifugal governor system. In this scenario, the engine speed can decrease to the point where engine 110 is at risk of stalling. Accordingly, an engine speed signal can be communicated to control unit 150 as the engine load signal where the engine speed can serve as a suitable proxy for the engine load.

Control unit 150 can be configured to receive and interpret the combination of the engine speed signal from the engine 110 and the control signal from ground speed control 166. As discussed above, for example, the engine speed signal communicated to control unit 150 can be dependent on a load applied to engine 110. In return, control unit 150 can transmit power to transmission 130 via transmission motor 132, thereby controlling the transmission speed or actual ground speed (e.g., by driving wheels 140) of the self-propelled machine.

Further in this regard, still referring to FIG. 3, a stall protection control scheme can be incorporated into control unit 150 to be implemented by the self-propelled drive system 100. The stall protection control scheme can be configured to be selectively enabled or disabled by the operator, so that the actual ground speed of the self-propelled machine can be the based on the desired ground speed, which can be limited by the engine speed. For example, an operator can selectively enable or disable a stall protection scheme by manipulating a control mechanism (e.g., a toggle button, switch, lever) carried on handle 162 of control device 160. Alternatively, the operator can interface with an LCD screen (not shown) provided on handle 162, or otherwise conveniently located on the self-propelled machine, in order to selectively enable or disable the stall protection scheme, In one aspect, the LCD screen can be configured to display visual confirmation that the operator has chosen to selectively engage various features of the self-propelled machine when he enables/disables external control mechanisms (e.g. toggle buttons, switches, levers, etc.). In another aspect, the LCD screen can be interactive by touch, whereby the operator can utilize icons, a menu system, etc. to selectively enable or disable said features, for instance, the stall protection scheme.

When activated, the stall protection scheme, as implemented by control unit 150, can automatically adjust the operation of transmission 130 under conditions where engine 110 is unable to provide the requested driving power to transmission motor 132 and might otherwise risk stalling. By comparison, in conventional self-propelled machines, such as lawnmowers, engine stall could occur in scenarios where the operator encountered longer length blades of grass. In such instances, the operator typically needed to either manually reduce the transmission speed (e.g. reduce any operator selected speed input, where such speed input was coupled to the transmission) or disengage the transmission drive completely in order to reduce the engine load. Accordingly, the engine stall protection scheme described herein is advantageous because it can enable the operator to maintain a constant setting of the actuation mechanism without any concern about the engine stalling during operation.

In particular, in one aspect, the stall protection control scheme can comprise applying a stall protection factor that can be configured to limit the operator selected desired ground speed based on the engine speed. For example, the stall protection factor can be applied to scale the operator selected desired ground speed (i.e., selected by ground speed control 166) to a reduced value determined by control unit 150. In one aspect, control unit 150 can determine the appropriate stall protection factor from a stall protection lookup table. Specifically, when control unit 150 receives the engine speed signal and the control signal indicating the operator selected desired ground speed, control unit 150 can use the stall protection lookup table to determine an appropriate stall protection factor based on the engine load indicated by the engine speed signal. For example, FIG. 4 illustrates one embodiment of an implementation of a stall protection look up table, where engine speed is measured in revolutions per minute (RPM) and the stall protection factor is configured to scale the power output to transmission 130 as a percentage of the operator desired ground speed.

Figure 4:
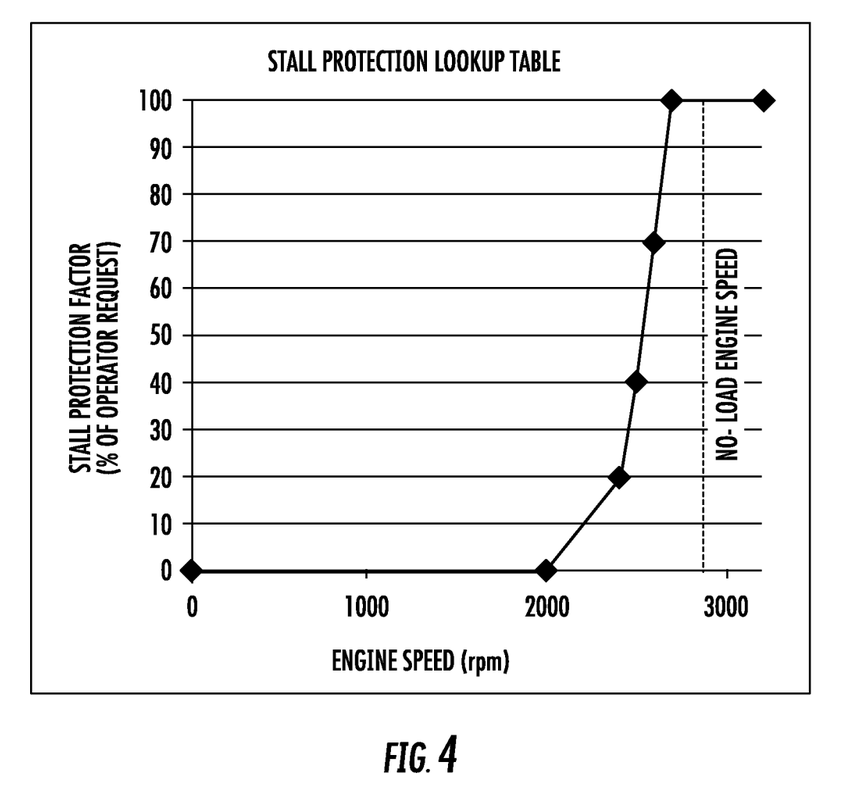
FIG. 4 is a graphical representation illustrating an implementation of a stall protection lookup table according to one aspect of the subject matter described herein.

For instance, as shown in FIG. 4, where engine speed reaches a higher end speed threshold, there can theoretically be a minimal to no load applied to engine 110 and no likelihood that engine 110 will stall. Thus, at the higher end speed threshold, the stall protection factor can be set at 100% of the operator's desired ground speed. In other words, in such a situation, the stall protection factor will not reduce the power output to transmission 130 below a level corresponding to the operator's desired ground speed. Thus, the actual ground speed will be set to achieve the desired ground speed indicated by the operator.

Conversely, where the engine speed is at or below a certain lower end speed threshold, a large enough load is being applied to the engine so that there is a high probability that the engine will stall. Thus, at an engine speed at or below the lower end speed threshold, the stall protection factor can be set at 0% of the operator's desired ground speed. In such a state, the stall protection factor can reduce the power output to transmission 130 below a level corresponding to the operator's desired ground speed to the point such that no power will be sent to transmission 130 of the self-propelled machine. Thus, the actual ground speed will be sufficiently reduced to prevent engine stall. Furthermore, when the engine speed is at an intermediate threshold, which can range from above the lower end speed threshold to below the higher end speed threshold, the stall protection factor can be configured to scale the power output to transmission 130 to any of a variety of intermediate levels (i.e., between full requested power and no power) based on the engine speed.

For example, in the particular configuration illustrated by FIG. 4, when the engine speed is at or below 2000 RPM then the stall protection factor will be at 0% of the operator's desired ground speed. In this scenario, if engine 110 is operating at or below 2000 RPM there is most likely a heavy enough load being applied to engine 110 such that there is a high probability of engine stall. In another example, the stall protection factor can variably increase as the engine speed increases from 2000 RPM up to 2500 RPM. In a further example, if the engine speed is at or more than 2500 RPM there is most likely no load, or at least a minimal load, being applied to engine 110. Where a minimal load is being applied to engine 110 the probability of engine stall is very slim. Thus, the stall protection factor will be 100% of the operator's desired ground speed. As a result, it can be determined that the stall protection factor increase is dependent on the load applied to engine 110. For example and according to FIG. 4, an engine with a heavier applied load can have a lower engine speed, which correlates to a lower stall protection factor. The converse can similarly be true.

Additional stall protection control schemes can include a derivative control factor. In one aspect, the derivative control factor can comprise a change in engine speed measured in RPM, or ARPM. For example, control unit 150 can receive the engine speed signal and the control signal, and interpret the engine speed signal in terms of the change in engine speed over a specified time frame. Control unit 150 can then determine the appropriate stall protection factor from a stall protection lookup table, which can be configured in terms of stall protection factor v. change in engine speed.

In view of FIG. 3, where the operator has enabled the engine stall protection control scheme, once control unit 150 determines the appropriate stall protection factor, control unit 150 can be configured to transmit power to transmission motor 132 which can be limited based on the power generated by engine 110 and transmitted to control unit 150, the stall protection factor, and the control signal. In one aspect, control unit 150 can apply the stall protection factor to a power algorithm. For example, the power algorithm can be a transmission drive current algorithm, measured in amps (A), such as:

[Transmission Drive Current]=[Full Current Output]*
[Operator Desired Ground Speed Control]*[Stall Protection Factor]

Control unit 150, however, can also be configured to transmit power to transmission motor 132 even if the operator has not enabled the engine stall protection control scheme. For example, control unit 150 can be configured to transmit power to transmission motor 132, which can be limited based on the power generated by engine 110 and transmitted to control unit 150 and the control signal. In one aspect, control unit 150 can use a power algorithm that does not include any stall protection factor. For example, the power algorithm can be a transmission drive current algorithm, measured in amps (A), such as:

[Transmission Drive Current]=[Full Current Output]*
[Operator Desired Ground Speed Control]

Figure 5:
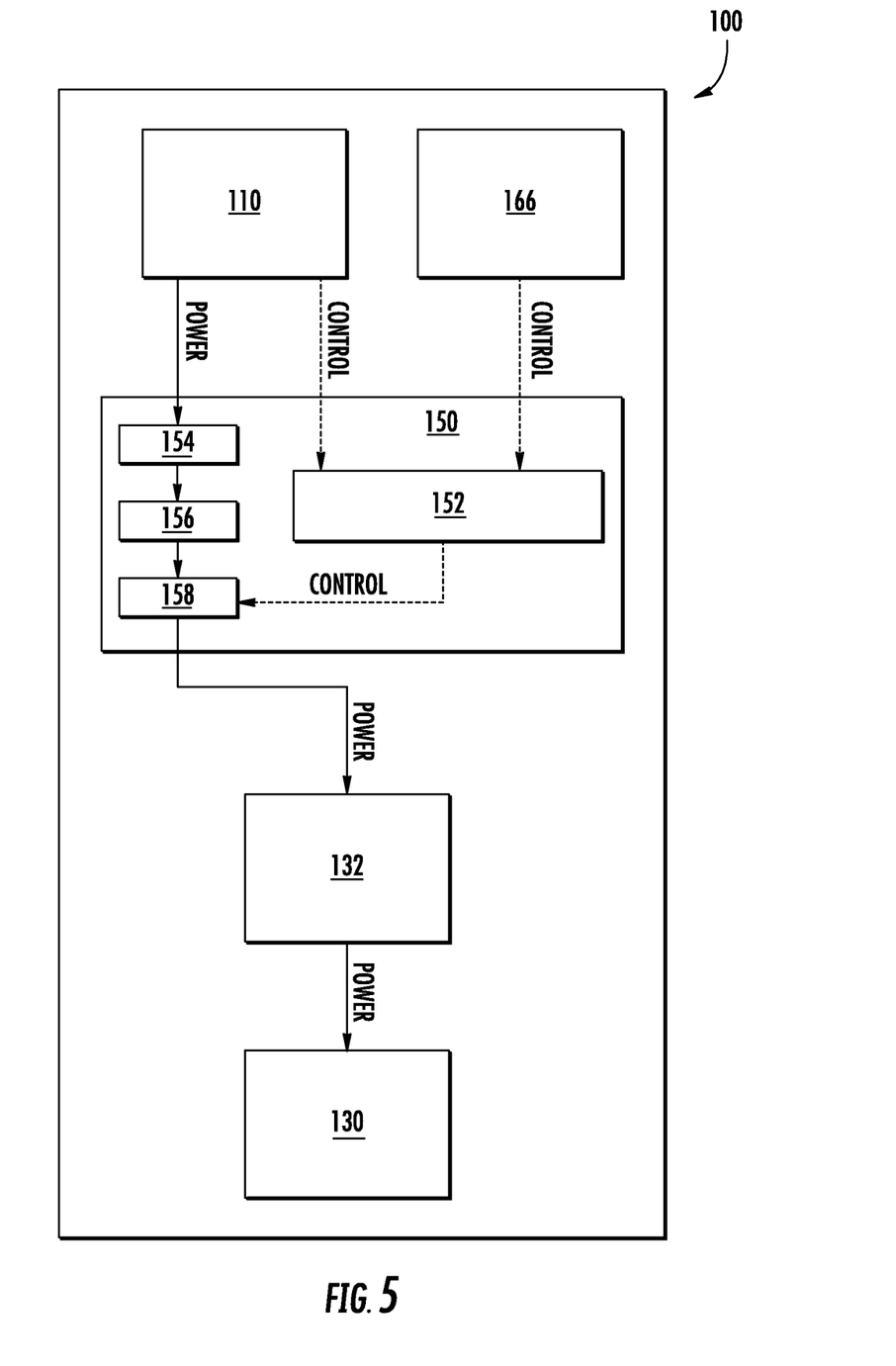
FIG. 5 is a block diagram illustrating a drive system for implementing engine stall protection in a self-propelled machine according to one aspect of the subject matter described herein.

In another aspect and as illustrated in FIG. 5, control unit 150 can comprise a microcontroller 152 (MCU) that can be configured to implement the stall protection control scheme, as discussed above, when it has been enabled by the operator, in order to send power to transmission motor 132. Conversely, MCU 152 can be configured to power transmission motor 132, as discussed above, when the stall protection control scheme has been disabled or not enabled by the operator.

For example, control unit 150 can be configured so that the engine speed signal and the control signal can be transmitted as a signal or pulse to microcontroller 152, while the engine speed can be transmitted to control unit 150, generally. Referring to engine 110, engine 110 can be configured to communicate engine power to control unit 150, separately from its communication of the engine speed. In one aspect, engine power can be communicated to control unit 150 as alternating current or AC power. Where engine 110 is configured to communicate AC power to control unit 150, then control unit 150 must convert AC power to DC power before reaching transmission motor 132. In one aspect, for example in FIG. 5, engine 110 transmits power to a rectifier 154 or any other device that converts alternating current (AC) to direct current (DC). After power has been converted from AC power to DC power, a DC power bus 156 can communicate said power in the form of a signal or pulse to a power delivery system, generally designated 158, in order to control the power supplied to transmission motor 132. Power delivery system 158 can comprise that of a pulse width modulator or (PWM), a potentiometer, or a rheostat. FIG. 5, for example, illustrates a self-propelled drive system 100 that can use a PWM in control unit 150.

With regard to engine speed, engine speed can be communicated to microcontroller 150 as the engine load signal where the engine speed can serve as a suitable proxy for the engine load. The engine speed can be communicated in the form of a signal or pulse, for example, as an electrical signal or pulse, using a sensor mounted to the stator of alternator of electrical actuator or generator 170. Similarly, an actuation mechanism can be configured to communicate a control signal to MCU 152. The control signal can be a pulse or signal indicating a desired ground speed that can be selectively chosen by the operator through manipulation of a ground speed control 166 (See, e.g. FIG. 2), such that the operator has a predetermined range of desired ground speeds to select from. For example, ground speed control 166 can be configured to transmit an electrical signal or pulse (e.g. a control signal) to control unit 150 by way of an electrical sensor. As discussed above, control unit 150 can be configured to interpret the operator-selected desired ground speed signal in view of the engine speed signal in order to control the ground speed of the self-propelled machine. Further, ground speed control 166 can also be adapted to vary the speed of one or more wheels 140 of the machine.

Consequently, and still referring to FIG. 5, microcontroller 152 can be configured to receive and interpret both the control signal that can be generated by the actuation mechanism and/or ground speed control 166 and the engine speed signal that can be generated by engine 110, which can be dependent on a load applied to engine 110. In return, microcontroller 152 can generate a signal or pulse output that can be transmitted to power delivery system 158 (e.g. PWM) in order to transmit power to transmission 130 via transmission motor 132. In one aspect, power delivery system 158 can increase or decrease the power supplied to transmission motor 132. The power to be delivered to transmission motor 132 can be dependent on the signal transmitted from MCU 152. MCU 152 can be configured to incorporate a stall protection control scheme that can be configured to be selectively enabled or disabled by the operator, so that the actual ground speed of the self-propelled machine will be the based on the desired ground speed, which can be limited by the engine speed. The stall protection control scheme can be configured in the manner discussed previously and can comprise a stall protection factor and/or a derivative control factor that can be determined from a stall protection look up table (See, e.g. FIG. 4).

Further reference to FIG. 5 indicates that power delivery to transmission motor 132 is similar to the power delivery discussed above with regard to the power algorithms. Transmission motor 132 can receive power from power delivery system 158 and transmit said power to transmission 130, whether or not the stall protection control scheme in the MCU 152 has been enabled by the operator.

Figure 6:
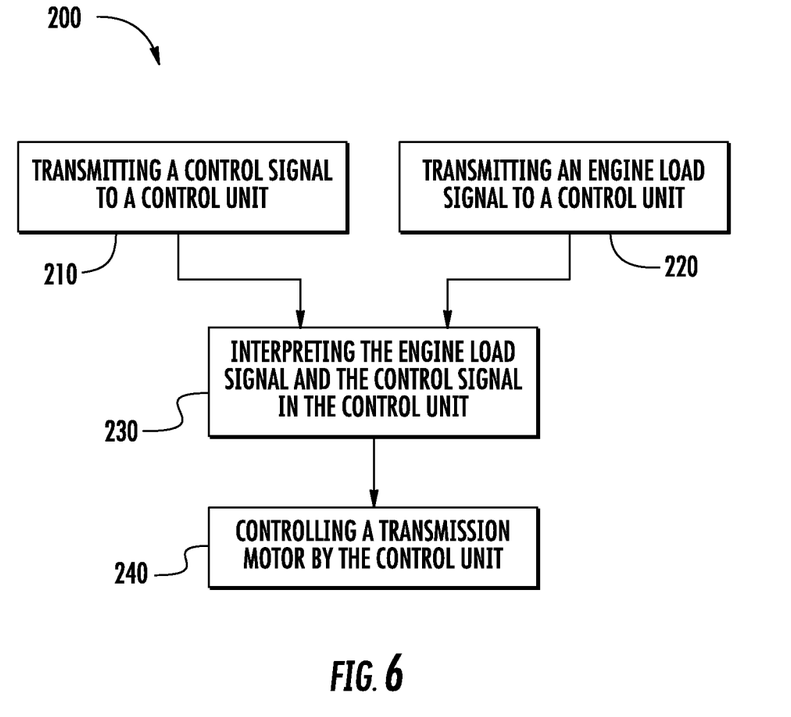
FIG. 6 is a flow chart illustrating a method for implementing engine stall protection in a self-propelled machine according to one aspect of the subject matter described herein.

FIG. 6 is a flow chart illustrating an exemplary method, generally designated 200, for implementing engine stall protection in a self-propelled machine described hereinabove. In some aspects, the method can consist of or include at least a first transmitting step 210 comprising transmitting a control signal to a control unit, the control signal being generated by an actuation mechanism that is actuatable by an operator to assign a desired ground speed of the self-propelled machine. In parallel with this transmission, method 200 can further comprise a second transmitting step 220 comprising transmission of an engine load signal to the control unit, wherein the engine load signal can be dependent on a load applied to engine 110. Method 200 can further comprise an interpreting step 230 comprising interpreting the engine speed signal and the control signal in control unit 150. Additionally, method 200 can comprise a controlling step 240 comprising controlling transmission motor 132 by control unit 150 to achieve an actual ground speed of the self-propelled machine based on both the engine speed and the control signal transmitted to control unit 150.

Aspects of the subject matter disclosed herein may provide one or more of the following beneficial technical effects: improved control of a self-propelled machine; easy speed change in a self-propelled machine; improved ease-of operation of a self-propelled machine; intuitive controls; improved comfort during operation of a self-propelled machine; low operator fatigue; and easy to understand controls.

While the present subject matter has been has been described herein in reference to specific aspects, features, and illustrative embodiments, it will be appreciated that the utility of the invention is not thus limited, but rather extends to and encompasses numerous other variations, modifications and alternative embodiments, as will suggest themselves to those of ordinary skill in the field of the present subject matter, based on the disclosure herein. Various combinations and sub-combinations of the structures and features described herein are contemplated and will be apparent to a skilled person having knowledge of this disclosure. Any of the various features and elements as disclosed herein may be combined with one or more other disclosed features and elements unless indicated to the contrary herein. Correspondingly, the subject matter as hereinafter claimed is intended to be broadly construed and interpreted, as including all such variations, aspects, modifications and alternative embodiments, within its scope and including equivalents of the claims.

What is claimed is:

1. A drive system of a self-propelled machine incorporating engine stall protection, the drive system comprising:
   an engine in communication with a control unit, the engine configured for transmitting power and an engine load signal to the control unit;
   an actuation mechanism that is selectively actuatable by an operator to assign a desired ground speed of the self-propelled machine, the actuation mechanism being in communication with the control unit and configured to transmit a control signal to the control unit corresponding to the desired ground speed; and
   a transmission motor in communication with the control unit and configured to propel the self-propelled machine along a ground surface;
   wherein the control unit is configured to control the transmission motor to achieve an actual ground speed of the self-propelled machine along the ground surface based on both the control signal and a transmission motor current setpoint corresponding to a stall protection factor associated with the engine load signal that is determined by the control unit from a stall protection lookup table.

2. The drive system of claim 1, wherein the engine load signal comprises an engine speed signal, wherein a speed of the engine is dependent on a load applied to the engine.

3. The drive system of claim 1, wherein the actual ground speed of the self-propelled machine along a ground surface is controlled to be less than the desired ground speed of the self-propelled machine based on a load applied to the engine.

4. The drive system of claim 1, wherein the control unit is configured to automatically reduce the actual ground speed of the self-propelled machine to reduce an engine load applied to the engine.

5. A method for implementing engine stall protection in a self-propelled machine, the method comprising:
transmitting a control signal to a control unit, the control signal corresponding to a desired ground speed of the self-propelled machine;
transmitting an engine load signal to the control unit, the engine load signal identifying a load applied to an engine of the self-propelled machine;
applying a stall protection control scheme to determine a value of a transmission motor current setpoint to be transmitted to a transmission motor of the self-propelled machine, wherein determining a value of a transmission motor current setpoint comprises applying a stall protection factor associated with the engine load signal that is determined by the control unit from a stall protection lookup table; and
controlling the transmission motor of the self-propelled machine by the control unit to achieve an actual ground speed of the self-propelled machine based on the transmission motor current setpoint and the control signal transmitted to the control unit.

6. The method of claim 5, wherein transmitting the control signal comprises manually actuating an actuation mechanism to assign the desired ground speed of the self-propelled machine.

7. The method of claim 5, wherein controlling the transmission motor comprises controlling the actual ground speed of the self-propelled machine to be less than the desired ground speed of the self-propelled machine based on the load applied to the engine.

8. The method of claim 5, wherein transmitting an engine load signal comprises transmitting an engine speed signal, wherein a speed of the engine is dependent on a load applied to the engine.

9. The method of claim 8, wherein determining a value of a transmission motor current setpoint comprises:
when the engine speed signal identifies an engine speed that is below a lower end speed threshold, selecting a 0% value for the stall protection factor from the lookup table such that no power is sent to the transmission motor; and
when the engine speed signal identifies an engine speed that is above a higher end speed threshold, selecting a 100% value for the stall protection factor from the lookup table such that a power output to the transmission motor corresponds to the desired ground speed.

10. The method of claim 9, wherein determining a value of a transmission motor current setpoint comprises, when the engine speed signal identifies an engine speed that is above the lower end speed threshold but below the higher end speed threshold, selecting a value for the stall protection factor from among one or more discrete intermediate values in the lookup table such that the power output to the transmission motor is scaled to an intermediate level between no power and a full power level corresponding to the desired ground speed.

11. The method of claim 5, wherein the stall protection lookup table is configured to assign a stall protection factor based on the engine speed.

12. The method of claim 5, wherein applying the stall protection control scheme further comprises applying a derivative control term.

13. The method of claim 12, wherein the stall protection lookup table is configured to assign a stall protection factor based on a change in the engine speed.

14. The method of claim 5, wherein controlling the transmission motor comprises automatically reducing the actual ground speed of the self-propelled machine to reduce the engine load applied to the engine.

15. A non-transitory computer readable medium having stored thereon executable instructions that when executed by the processor of a computer control the computer to perform steps comprising:
receiving a control signal generated by an actuation mechanism of a self-propelled machine corresponding to a desired ground speed of the self-propelled machine;
receiving an engine load signal generated by an engine of the self-propelled machine;
applying a stall protection control scheme to determine a value of a transmission motor current setpoint to be transmitted to a transmission motor of the self-propelled machine, wherein determining a value of a transmission motor current setpoint comprises applying a stall protection factor associated with the engine load signal that is determined by the control unit from a stall protection lookup table; and
controlling the transmission motor of the self-propelled machine to achieve an actual ground speed of the self-propelled machine based on the transmission motor current setpoint and the control signal transmitted to the control unit.

16. The non-transitory computer readable medium of claim 15, wherein receiving an engine load signal comprises receiving an engine speed signal, wherein a speed of the engine is dependent on a load applied to the engine.

17. The non-transitory computer readable medium of claim 16, wherein determining a value of a transmission motor current setpoint comprises:
when the engine speed signal identifies an engine speed that is below a lower end speed threshold, selecting a 0% value for the stall protection factor from the lookup table such that no power is sent to the transmission motor; and
when the engine speed signal identifies an engine speed that is above a higher end speed threshold, selecting a 100% value for the stall protection factor from the lookup table such that a power output to the transmission motor corresponds to the desired ground speed.

18. The non-transitory computer readable medium of claim 17, wherein determining a value of a transmission motor current setpoint comprises, when the engine speed signal identifies an engine speed that is above the lower end speed threshold but below the higher end speed threshold, selecting a value for the stall protection factor from among one or more discrete intermediate values in the lookup table between 0% and 100% such that the power output to the transmission motor is scaled to an intermediate level between no power and a full power level corresponding to the desired ground speed.

19. The non-transitory computer readable medium of claim 15, wherein applying the stall protection control scheme comprises applying a derivative control term based on a change in the engine speed.

20. The non-transitory computer readable medium of claim 15, wherein controlling the transmission motor comprises automatically reducing the actual ground speed of the self-propelled machine to reduce the engine load applied to the engine.

* * * * *